June 14, 1938.  F. W. COTTERMAN  2,120,831
PLANETARY TRANSMISSION MECHANISM
Filed Sept. 17, 1935  4 Sheets-Sheet 1
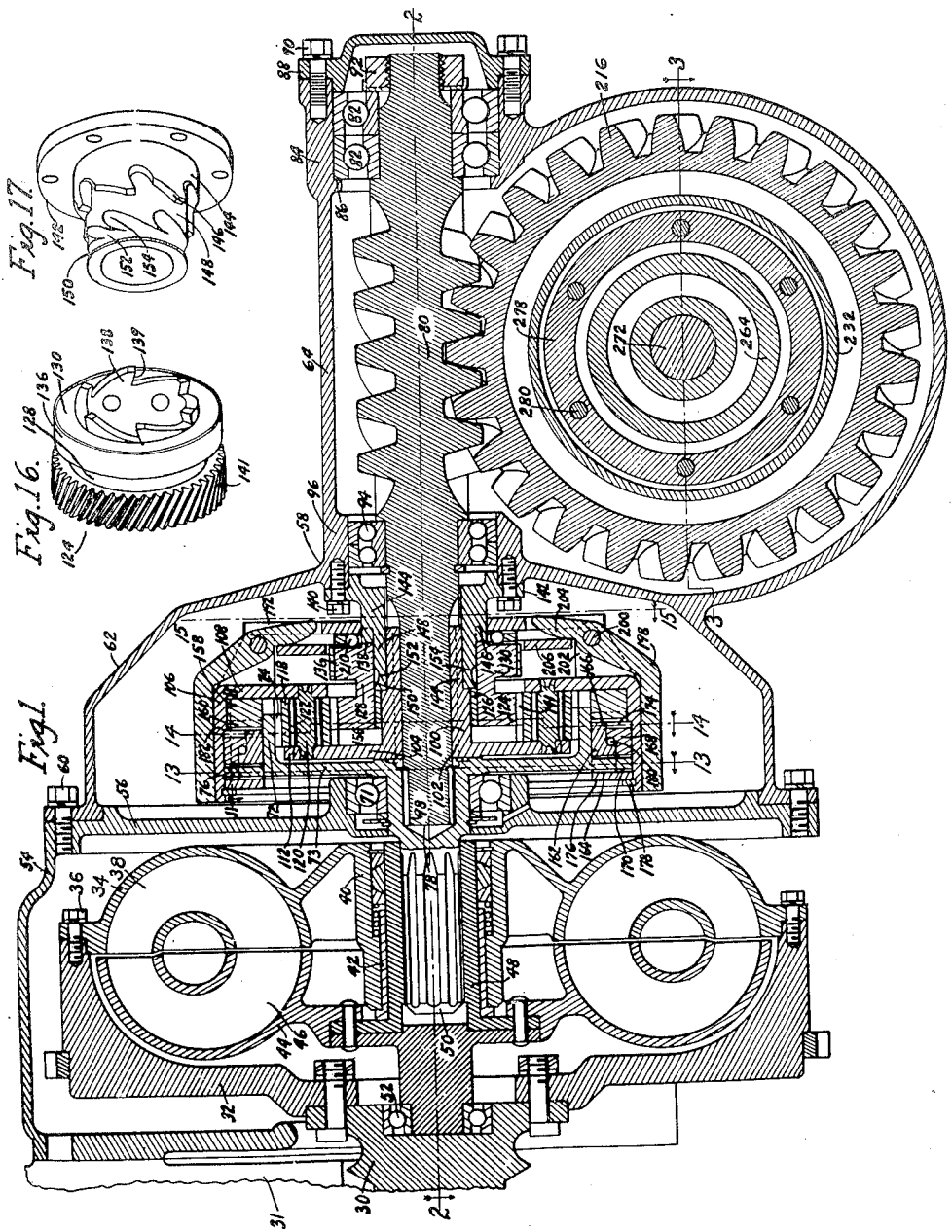
INVENTOR
Frederick W Cotterman

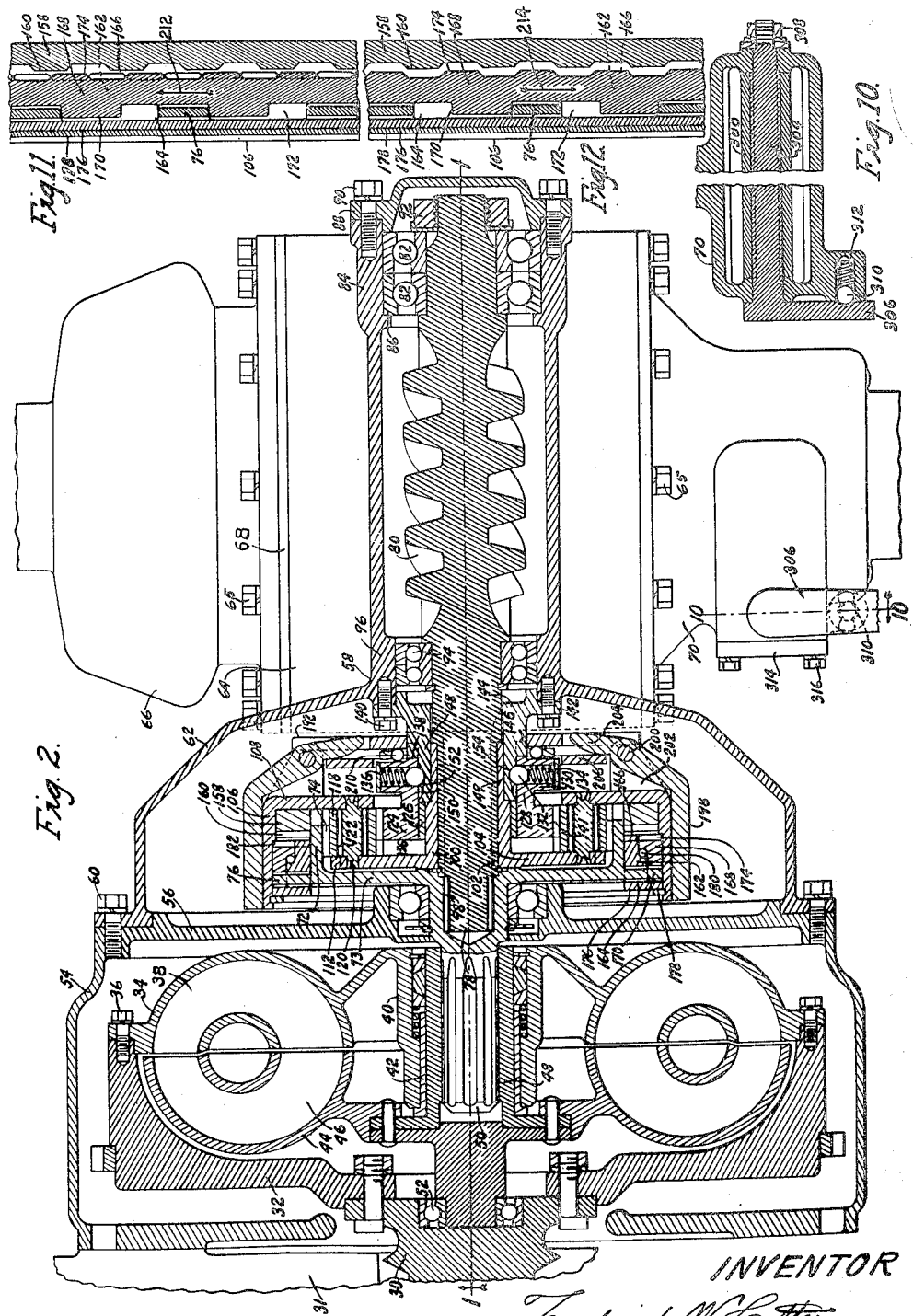

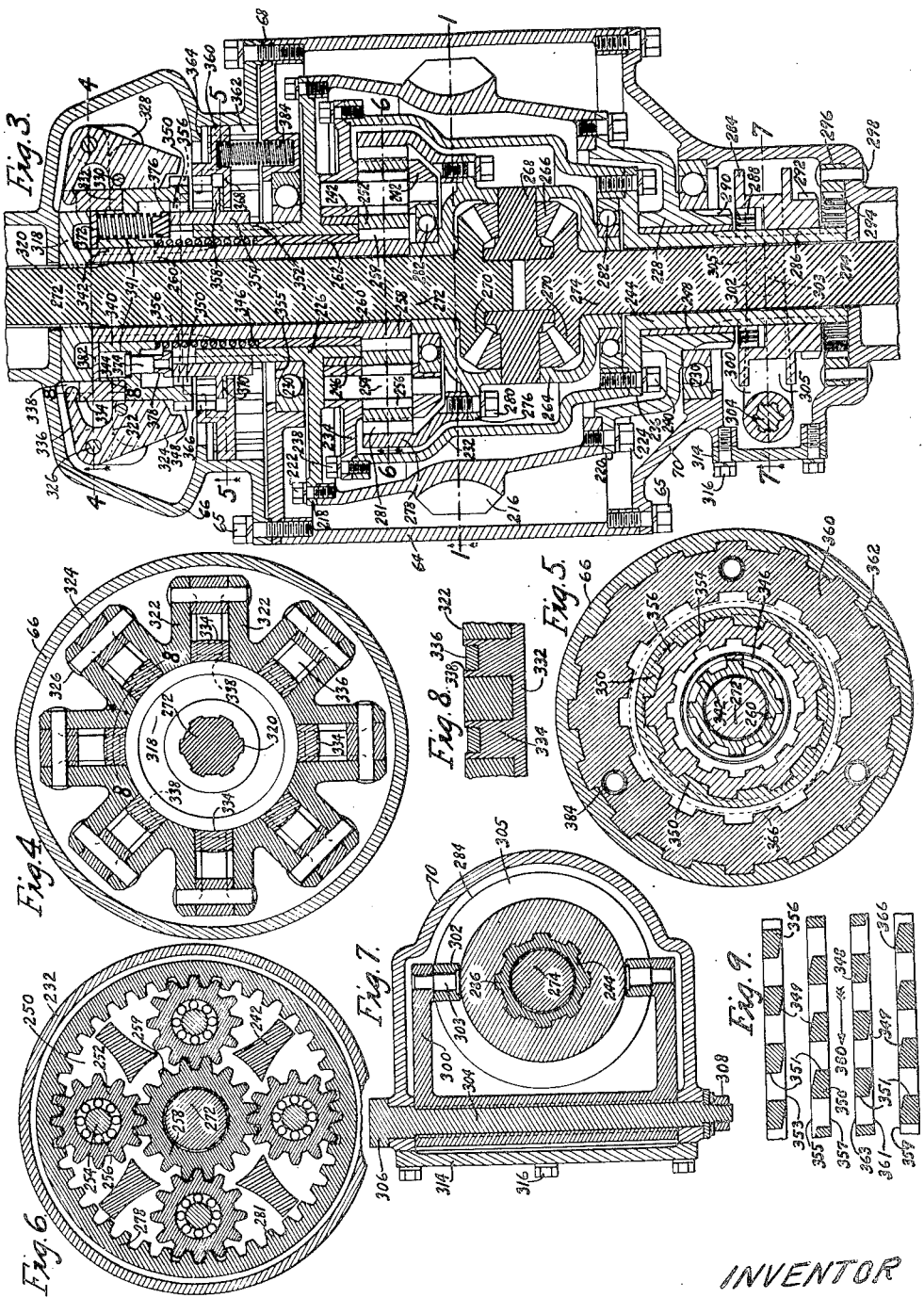

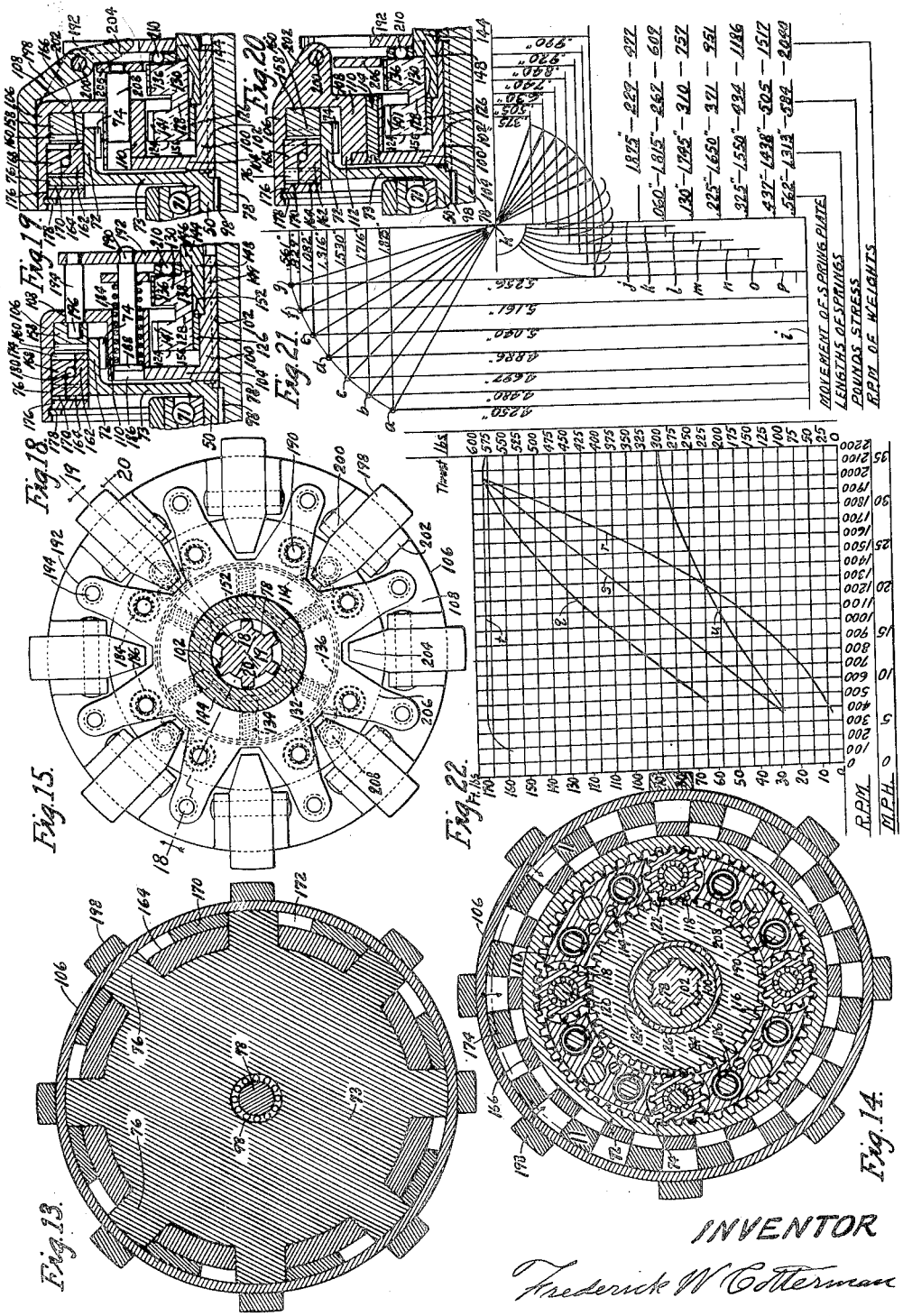

Patented June 14, 1938

2,120,831

UNITED STATES PATENT OFFICE 2,120,831

PLANETARY TRANSMISSION MECHANISM

Frederick W. Cotterman, Dayton, Ohio, assignor of one-half to Bessie D. Apple, Dayton, Ohio Application September 17, 1935, Serial No. 40,946

26 Claims. (Cl. 74—314)

This invention relates to a power transmission mechanism, particularly applicable to automotive vehicles and embodies some of the features of my copending application Serial No. 26,765, filed June 15, 1935.

An object of the invention is to provide transmission mechanism in which the most used or middle portion of the driving range of a vehicle will be effected thru direct drive, to the end that the only gearing normally operative between the engine and road wheels will be the conventional axle gearing which is usually either a worm and wheel, or a bevel pinion and gear, then supplementing the axle gearing with a speed reducing or underdrive gear-set between the engine and axle automatically operative at the lower speeds upon overload, and with a speed increasing or overdrive gear-set between the axle gearing and the road wheels which may become automatically operative only at exceptionally high speeds.

Another object is to provide a fluid coupling for connecting the underdrive gear-set to the engine, whereby less speed reduction need be had thru the underdrive gear-set and consequently less engine rushing results in accelerating the vehicle to a given speed.

Another object is to provide, for the underdrive gear-set, one having constant mesh gearing but wherein there are no roller, spring, or friction clutches, but only two jaw clutches, one, the gear drive clutch, being operative when the power is being transmitted thru the gearing and the other, the direct drive clutch, when the power is being transmitted thru the mechanism directly, the jaw clutches being provided with means whereby they may become engaged and disengaged only at synchronism of their respective parts to the end that they may engage and disengage at high vehicle speeds without rattle or clash.

Another object is to provide, in the underdrive gear-set, clutch engaging means which at all times tends to hold the direct drive clutch in engagement, with torque responsive means tending to disengage said clutch upon overload, and with speed responsive means for increasing the capacity of the clutch engaging means to hold the clutch engaged which is more nearly in proportion as the square root of the R. P. M. instead of as the square of the R. P. M. as in common practice, to the end that the overload point of the clutch may be sufficiently high at the lower speeds without being too high at the higher speeds.

Another object is to provide, in the underdrive gear-set, torque responsive means which will, upon disengagement of the direct drive clutch by overload, hold the said clutch completely and fully disengaged until the torque being applied is substantially reduced by decrease of the fuel being supplied to the engine.

Another object is to provide, in the overdrive gear-set which is interposed between the conventional axle gearing and the road wheels, two speed responsive jaw clutches one of which normally connects the said axle gearing and road wheels directly independently of the overdrive gearing, the other being adapted to become operative at a predetermined speed, by momentary release of the applied torque, to connect the said axle gearing to the road wheels thru the overdrive gearing, to the end that the lesser percentage of driving only which is done at very high speeds need be done thru the overdrive gearing thereby leaving all normal speeds to be effected thru the axle gearing only.

Another object is to so construct the overdrive speed responsive jaw clutches as to insure that, in the transition from direct to overdrive connection or vice versa, there will be no interval wherein neither clutch is engaged, to the end that no overrunning clutches, such as roller or spring clutches need be used and no free wheeling will be had either in direct, in overdrive, or in the transition period between the two drives.

Another object is to provide means whereby the same overdrive gear-set may be made operative in a reverse direction as speed reducing gearing for reversing the vehicle, to the end that no additional gears need be provided for this purpose.

Another object is to provide a manually operable means operative to three positions to provide forward, neutral and reverse connections between the axle gearing and the road wheels, said means being incorporated in the axle mechanism and contained within the axle housing.

That these and many other objects and meritorious features are attained will become apparent as the mechanism is described in greater detail and reference is had to the drawings, wherein, Fig. 1 is a longitudinal vertical section thru the mechanism taken on the lines 1—1 of Figs. 2 and 3.

Fig. 2 is a longitudinal horizontal section taken on the line 2—2 of Fig. 1.

Fig. 3 is a horizontal section taken on the line 3—3 of Fig. 1.

Fig. 4 is a transverse section taken at 4—4 of

Fig. 3 thru the speed responsive device which operates the overdrive clutches.

Fig. 5 is a transverse section taken at 5—5 of Fig. 3 thru the overdrive clutch parts.

Fig. 6 is a transverse section taken at 6—6 of Fig. 3 thru the overdrive gearing.

Fig. 7 is a transverse section taken at 7—7 of Fig. 3 thru the manually operable forward, rearward, and neutral mechanism.

Fig. 8 is a flattened section along the arcuate surface 8—8 of Figs. 3 and 4 showing the stationary and movable parts of the speed responsive device which operates the overdrive clutches.

Fig. 9 shows diagrammatically a series of the clutch teeth of Fig. 5 to illustrate the manner in which the side faces of the clutch teeth must be beveled.

Fig. 10 is a section taken at 10—10 of Fig. 2 thru the operating rod and lever of the manually operable forward, rearward, and neutral mechanism showing the detent mechanism for holding the device in its several positions.

Fig. 11 shows diagrammatically a series of the teeth of the direct drive clutch of the underdrive gear-set showing how parts of the teeth of the driving member are kept misaligned for the purpose of excluding the teeth of the driven member until synchronization of the driving and driven members takes place.

Fig. 12 is a view similar to Fig. 11 except that the clutch teeth are shown with the parts of the teeth of the driving member aligned to receive the teeth of the driven member.

Fig. 13 is a transverse section taken at 13—13 of Fig. 1 thru the driving element of the underdrive gear-set illustrating also the driving lugs of the driving member of the direct drive clutch.

Fig. 14 is a transverse section taken at 14—14 of Fig. 1 thru the underdrive gearing and thru the springs which constitute the variable means for keeping the direct drive clutch engaged, showing also the parts of the clutch driving teeth in the misaligned non-engageable arrangement.

Fig. 15 is a transverse section taken at 15—15 of Fig. 1 showing the greater portion of the underdrive gear-set including its speed responsive operating device in end elevation.

Fig. 16 is a detail perspective view of the sun gear of the underdrive gear-set showing its integral jaw clutch part which, upon engagement holds the sun gear stationary thereby to effectuate gear drive.

Fig. 17 is a detail perspective view of the stationary jaw clutch part which engages the part in Fig. 16 to hold the sun gear against rotation.

Fig. 18 is a fragmentary section taken at 18—18 of Fig. 15 showing the several parts of the direct drive clutch, its pressure pins, pressure plate, clutch engaging springs, and spring stressing plate.

Fig. 19 is a fragmentary section taken at 19—19 of Fig. 15 showing one of the guide pins of the spring pressure plate and a centrifugal weight and cam for moving the spring pressure plate.

Fig. 20 is a fragmentary section taken at 20—20 of Fig. 15 showing the means of securing together the two parts of the planet pinion carrier which is the driven element of the underdrive gear-set.

Fig. 21 is a diagram showing a number of positions which the center of gravity of one of the centrifugal weights takes and corresponding positions of the cam which regulates the stress of the direct drive clutch engaging springs.

Fig. 22 is a diagram showing the clutch engaging force of the springs at various vehicle speeds.

The crank shaft 30 of an internal combustion engine carries a fluid coupling comprising the flywheel 32 to the outer face of which the cover 34 is secured by screws 36. The cover 34 carries the driving vanes 38 and a hub 40 having a bearing bushing 42 within which the driven element rotates.

The driven element 44 carries the vanes 46 and the central hollow journal 48 upon which the driven member has rotative bearing. The journal 48 is internally splined to receive the externally splined drive shaft 50 of the under-drive gear-set. A ball bearing 52 is provided to take the thrust of the driven element 44. A flywheel cover 54 encloses the flywheel and coupling and supports the transmission housing.

The outer face of the cover 54 is closed by the end wall 56 which serves also as an end closure for the transmission housing. A main casting 58 is screwed to the wall 56 by the screws 60. Casting 58 integrally comprises the transmission housing 62 and the axle housing 64, the housing 62 containing the underdrive gear-set and the housing 64 containing the axle gearing which in the case consists of a worm and a worm wheel and the overdrive gear-set.

An end head 66 closes one end of the axle housing 64 and is secured thereto by the screws 65 and provides space for the overdrive clutches and their speed responsive clutch operating mechanism. A bearing plate 68 separates the space within the axle housing 64 from the space within the end head 66.

A second end head 70 closes the other end of the axle housing 64 and is secured thereto by the screws 65 and provides space for the manually operable forward, rearward, and neutral mechanism.

Both the underdrive and overdrive gear-sets herein employed are of the planetary type each comprising a sun gear, several planet pinions adapted to both rotate upon their axes and revolve around the sun gear, a planet pinion carrier comprising means upon which the pinions may rotate about their individual axes and means compelling revolution of the pinions bodily in an orbit concentric with the sun gear, and a ring gear surrounding and meshing with the planet pinions.

In the underdrive gear-set the splined drive shaft 50 is rotatable in ball bearing 71 supported in the end wall 56 and has integral therewith the flange 73 and ring gear 72. Ring gear 72 has internal helical gear teeth 74 and a series of spokes 76 extending radially from its outer periphery, the gear teeth 74 being the means thru which power is applied during gear drive and the spokes 76 being the means thru which power is applied during direct drive.

The driven shaft 78 of the underdrive gear-set is cut in one piece with the worm 80 of the axle gearing. A large double row ball bearing 82 is held in hub 84 between a shoulder 86 and the end of the cap 88. The cap 88 is secured by screws 90 and the bearing is secured to the worm by the nut 92. The bearing 82 carries half the radial load and all of the thrust of the axle gearing.

A smaller ball bearing 94 slidably held in the hub 96 and free to move endwise therein carries the other half of the radial load of the axle gearing. A small roller bearing 98 rotatable in the end of the drive shaft 50 supports the end of the driven shaft 78 but due to the nature of the underdrive gearing this bearing is required to carry substantially no load either radial or thrust.

The underdrive planet pinion carrier is made up of two main parts, the one part comprising an internally splined hub 100 snugly fitted over external splines 102 on driven shaft 78 with an outwardly extending flange 104, and the other part comprising a drum 106 with an inwardly extending flange 108 and a large hollow hub 110 extending integrally from the flange 108 to the flange 104 (see Fig. 20).

The hub 110 extends over the outside of the flange 104 at 112 to maintain concentric relation, and rivets 114 hold the hub securely to the flange. At four equally spaced points (see Fig. 14) the hub 110 is completely cut away as at 116 to make room for the planet pinions 118. Studs 120 are located centrally of the openings 116, the ends being held and riveted in the flanges 104 and 108 (see Fig. 1 or 2). The planet pinions 118 are rotatable on roller bearings 122 carried on the studs 120 and are thereby held in correct mesh with the internal teeth 74 of the ring gear 72.

The outside of the internally splined carrier hub 100 is ground smooth to provide a journal upon which the sun gear 124, shown in detail in Fig. 16, may rotate. A bearing bushing 126 is press fitted to the inside of the sun gear. An integral hub 128 extends rearwardly from the sun gear and is enlarged at 130 to provide a place for radial openings to contain the balls 132 and springs 134. A band 136 surrounds the hub to retain the springs. The extreme end of the hub is formed to compose jaw clutch teeth 138 which it will be noted are hooked as at 139 to maintain engagement under load. The gear teeth 141 are helical and at such an angle as to create an end thrust in the direction which urges the jaw teeth 138 to remain engaged.

Concentrically secured by the screws 140 to the end of the hub 96 is the flanged jaw clutch member 142, shown in detail in Fig. 17. A hub 144 extending from the flange has cut integral thereon the jaw clutch teeth 146 which correspond to and are engageable with the jaw clutch teeth 138 of the sun gear 124. A prolongation 148 of the hub 144 extends into the space left between the inside diameter of the sun gear and the smaller end 149 of the carrier hub 100.

Near the end of the hub 148 a round bottomed groove 150 extends completely around it. From this circular groove at equally spaced points around it other round bottomed grooves extend somewhat helically, forming the guideways 152 within which the balls 132 act as followers which may move to carry the sun gear 124 endwise along the hub 148. The guideways are somewhat deeper at their ends 154 than they are where they join the groove 150 so that radially inward pressure on the balls creates a slight tendency to cause the gear to move toward the jaw clutch member 142.

Fig. 2 shows the sun gear 124 when it is moved endwise as far as it will go with its jaw clutch teeth 138 fully meshed with the jaw clutch teeth 146 carried by the flanged member 142, and with the balls 132 in the deep ends 154 of the guideways 152. In this position the sun gear 124 is held against backward rotation as it must necessarily be held to provide gear drive. The sun gear may, however, move axially on the hub 148 into the space 156 by drawing the balls 132 along the guideways 152 to and into the circular groove 150, whereupon the sun gear is free to rotate forwardly as it must during direct drive.

The weight of the balls 132 and the strength of the springs 134 is preferably such that the centrifugal force of the balls becomes greater than the strength of the springs when the sun gear rotates about 600 R. P. M. This proportion will allow ample pressure on the balls inasmuch as the only time the balls need become operative as followers to press downward in the guideways and guide the jaw clutch into engagement is when the sun gear 124 has completely ceased rotation and starts to rotate backwardly.

The balls 132, therefore, are never in frictional engagement with the groove 150 or the guideways 152 except a fraction of a second each time the change from direct drive to gear drive and vice versa is taking place. As soon as the sun gear 124 rotates forwardly in direct drive the balls are drawn out of contact with the guideways and groove by centrifugal force.

The guideways 152 are so located with respect to the teeth 146, and the balls 132 are so located with respect to the teeth 138 that whenever the balls follow the helical paths the mating clutch teeth approach each other in proper relation for full depth engagement. This is important, for where a jaw clutch is employed and is permitted to engage without such guiding means, it frequently happens that the mating teeth engage with a very shallow hold thus throwing an excessive strain on the points of the teeth which results usually in the engaged teeth slipping off and creating a jerk in the carrying of the load. Such slipping off also soon breaks away the sharp corners of the teeth.

Contained within the drum portion 106 of the planet pinion carrier are the several parts which comprise the direct drive jaw clutch. A driven clutch ring 158 is secured to the drum 106 to rotate therewith but has limited axial movement therein. One face of the clutch ring 158 has jaw teeth 160 thereon (see Figs. 11 and 12).

An inner driving clutch ring 162 closely surrounds the ring gear 72 and has lugs 164 on one face fitting closely between the spokes 76 of the ring gear, and has jaw teeth 166 on the other face corresponding to and adapted for engagement with the jaw teeth 160 of the driven clutch ring 158. An outer driving clutch ring 168 surrounds the inner ring 162 and has lugs 170 on one face also extending between the spokes 76. The lugs 170, however, do not nearly fill the space between the spokes by an amount equal to the spaces 172 whereby the outer ring 168 is driven by the spokes 76 with considerable lost motion. The opposite face of the outer clutch ring 168 also has jaw teeth 174 which correspond to and are adapted for engagement with the jaw teeth 160 of the driven clutch ring 158.

The lost motion spaces 172 correspond in circumferential extent exactly to the circumferential measurement of a jaw tooth 174. Therefore when the lost motion of the outer driving clutch ring 168 is taken up in one direction the jaw teeth 174 on its opposite face are misaligned with the jaw teeth 166 of the inner driving clutch ring 162, as in Figs. 11 and 14, but when the lost motion of the outer driving clutch ring 168 is taken up in the other direction its jaw teeth 174 will be aligned with the jaw teeth 166 of the inner driving clutch ring 162, as in Fig. 12. It will be seen that when the jaw teeth are arranged as in Fig. 12 the direct drive clutch may become engaged but when they are arranged as in Fig. 11 it may not become engaged.

A backing ring 176 is held in the drum 106 by the spring ring 178 which is sprung into a groove in the inside of the drum. The ends of the lugs 164 of the inner driving clutch ring 162 rest against the backing ring 176 thereby preventing said ring being pushed out of the drum.

The lugs 170 of the outer driving clutch ring 168, however, are shorter than the inner ring lugs 164 and therefore do not reach the backing ring (see Figs. 18, 11, and 12). A circular row of ground steel balls 180 is interposed between the shoulders of the rings 162 and 168 whereby the outer ring may be pushed against the inner, and the inner thereby be pushed against the backing ring. The balls 180 provide antifriction bearing means whereby the outer ring 168 may rotate with respect to the inner ring 162 thru the lost motion space 172 with little resistance when the springs 184 have pressed the ends of the teeth 160 of the driven clutch ring 158 (see Fig. 11) against the ends of the teeth 166 and 174 of the driving clutch rings 162 and 168 preparatory to effecting direct driving clutch engagement. A shoulder 182 in the drum 106 prevents endwise movement of the clutch rings 162 and 168 in the drum, the said rings being fitted to rotate freely between this shoulder and the backing ring 176.

In the drawings the direct drive clutch above described is shown fully disengaged as it will always be whenever gear drive is in effect. There is, however, means constantly urging the direct drive clutch into engagement. This means comprises the springs 184 contained in the openings 186 of the hub 110 (see Figs. 14, 15, and 18).

Springs 184 act against the heads 188 of the studs 190 whereby the pressure plate 192 is caused to push the pressure pins 194 against the driven clutch ring 158 thereby urging said ring always toward the driving clutch rings 162 and 168. The pressure pins 194 extend slidably thru holes in the flange 108 and are then reduced in diameter at 196 where they enter the driven clutch ring 158. Pins 194 therefore not only act to push the ring 158 axially but also compel rotation of the ring in unison with the drum 106.

The speed responsive mechanism which is provided to vary the stress of the springs 184 and thereby vary the clutch engaging pressure comprises the weights 198 hingedly supported by pins 200 extending thru ears 202 which are carried on the face of the flange 108. Inwardly of the hinge pins the weights are shaped in the form of a cam 204 against the heel of which the spring stressing plate 206 normally rests (see Fig. 19). Guide pins 208 extend from plate 206 into holes in the hub 110 to insure that no weight 198 may move outwardly from the axis faster than the others and thereby create an unbalanced effect. A ball thrust bearing 210 is interposed between the enlarged portion 130 of the sun gear and the pressure plate 192 whereby axial movement of the sun gear into the gear drive position shown in the drawings forces the pressure plate back against the stress of the springs 184 to completely disengage and prevent rubbing between the driving and driven rings of the direct drive clutch, the helix angle of the teeth 141 of the sun gear and its hooked jaw teeth 138 both cooperating to maintain this relation as long as the sun gear is under sufficient load.

The extent to which the sun gear 124 must be unloaded during gear drive to effect direct drive, and the extent to which it must be overloaded during direct drive to effect gear drive is determined by the position of the weights 198 and therefore by the vehicle speed.

Fig. 21 shows diagrammatically the operation of the centrifugal weights 198 and their cams 204 on the spring stressing plate 206 and the springs 184. The diagram is drawn to a scale double that in the remainder of the drawings.

Assuming for illustration that the mechanism herein described is to be used with a 90 H. P. engine capable of delivering a maximum of 170 foot pounds torque, the eight weights 198 should together weigh 1.67 pounds. The diagram Fig. 21 assumes that the eight weights have been combined into one and that its center of gravity when the weight is at rest and as close to the axis of rotation as it may get will be at "a" and that when the weight has swung out as far from the axis of rotation as it may, its center of gravity will be at "g", the points "b", "c", "d", "e", and "f" being intermediate positions of the weight.

The point "h" represents a hinge pin 200. The line "i" represents the axis of rotation. A line drawn between "a" and "h" is at an angle of thirty degrees with the axis "i" and a line drawn between "g" and "h" is at an angle of seventy five degrees with the axis "i". Points "b", "c", "d", "e", and "f" are equally spaced between points "a" and "g".

The line "j" represents the rear face of the spring stressing plate 206 against which the cam 204 rests when the weight is at "a". The lines "k", "l", "m", "n", "o", and "p" represent the positions to which the rear face of the spring stressing plate 206 is moved by the cam 204 when the weight takes the positions "b", "c", "d", "e", "f", and "g" respectively.

It will be observed that, when the weight is in the home position "a" (see also Fig. 19), the heel of the cam 204 bears on the rear face of the spring stressing plate 206, but when the weight is in the extreme outward position "g", whereby the rear face of the spring stressing plate has been moved to the line "p", the toe of the cam 204 bears on the rear face of the spring stressing plate 206.

In the intermediate positions "b", "c", "d", "e", and "f" of the weight whereby the plate has been moved respectively to the lines "k", "l", "m", "n", and "o" the cam bears on the plate at points intermediate the heel and toe.

By reference to the diagram Fig. 21 it will be seen that, when the weight is at "a" it is 4.250 inches from the axis of rotation "i" and the centrifugal force which this 1.67 pound weight exerts at this distance from the axis is applied to the back of the spring stressing plate 206 thru a leverage of $$\frac{1.875}{.375}$$

but that when the weight is at "g", the centrifugal force which the 1.67 pound weight exerts at 5.256 inches from the axis is applied thru a leverage of $$\frac{.561}{.990}$$

and that at intermediate positions of the weight the force it applies to the plate is applied thru intermediate leverages.

By employing eight springs of $\frac{3}{32}$ inch round wire coiled to ½ inch pitch diameter, having a lead of about 4½ turns per inch, and having a free height of 2.238 inches, and by having these springs already compressed to 1.875 inches when the weight is in the position "a", it may be found by simple mathematics that the springs will provide an initial stress of 229 pounds (see Fig. 21); that the weight in assuming the positions "b", "c", "d", "e", "f", and "g" acting thru the cam will shorten the springs to lengths 1.815, 1.745, 1.650, 1.550, 1.438, and 1.313 inches, respectively; that at these lengths the spring stress will be 267, 310, 371, 434, 505, and 584 pounds respectively; and that the weight, to equal these stresses when in the positions "b", "c", "d", "e", "f", and "g", must, when acting thru the progressively decreasing leverage indicated, be revolving 609, 757, 951, 1186, 1517, and 2040 R. P. M. respectively.

By reference to Figs. 11 and 12 it will be seen that the driving teeth 166 and 174 of the direct drive clutch are beveled about 45 degrees. There is, therefore, always as much force urging the driven clutch ring 158 axially out of engagement as the tangential load carried by its teeth 160. It follows that the tangential load which the direct drive clutch will carry, without being forced out of engagement thereby, varies as the stress of the springs which varies as the R. P. M. of the weights which in turn vary as the vehicle speed.

In the chart Fig. 22, the vertical column of figures at the left indicates the foot pounds torque which it is possible for the engine to deliver, the column at the right, the thrust which said foot pounds create in trying to disengage the direct drive clutch in opposition to the clutch engaging effort of the springs, and the figures at the bottom the M. P. H. of the vehicle and corresponding R. P. M. of the weights.

The curve "q" is plotted in accordance with the two columns of figures in Fig. 21 designated "pounds stress" and "R. P. M. of weights". Thus the curve passes thru the points where 2040 R. P. M. intersects 584 pounds stress, where 1517 R. P. M. intersects 505 pounds stress, 1186 R. P. M. intersects 434 pounds stress etc. By this curve it may be seen that, at 10 M. P. H. there may be applied 77 foot pounds engine torque, or 45 percent of maximum engine torque without forcing the direct drive clutch out of engagement and causing gear drive; that at 20 M. P. H. there may be applied 127 foot pounds or 75 percent of maximum without disengaging the clutch; and that at 30 M. P. H. 162 foot pounds or 95 percent of maximum torque may be applied.

In order to more clearly show the reason for progressively decreasing the leverage thru which the weight acts as it moves farther from the axis of rotation as indicated in Fig. 21, a curve "r" is drawn showing how a conventional centrifugal weight having capacity to produce 584 pounds spring stress at 2040 R. P. M. falls off rapidly in capacity at the lower speeds.

By referring to the curve "r" it will be seen that at 10 M. P. H. there could be applied only 15 foot pounds, or 9 percent of maximum engine torque without forcing the direct drive clutch out of engagement and causing gear drive; that at 20 M. P. H. there could be applied only 58 foot pounds or 34 percent of maximum engine torque without disengaging the clutch, and that at 30 M. P. H., 133 foot pounds or 78 percent of maximum engine torque may be applied. A line "s" is drawn on which the pounds thrust is in direct proportion to the R. P. M. to show by comparison the difference between the thrust developed by the herein described clutch engaging mechanism and the conventional. It will be seen that on the curve "r" at the lower speeds the thrust increases only in direct proportion to the R. P. M. but at the higher speeds it increases substantially in proportion as the square root of the R. P. M. It is obvious, however, that the active surface of the cam 204 may be shaped so as to produce any rate of increase in thrust, in proportion to the speed, within reason.

The foregoing comparison makes clear one of the reasons why speed-torque transmissions have not to date been commercially adopted, speed-torque mechanisms being those wherein the direct drive clutch is held in engagement by a speed responsive device and urged out of engagement by a torque means, because when weights were designed to properly balance the torque at high speed they created forces wholly insufficient at the lower speeds.

The result was that any attempt to drive in direct drive at the lower speeds resulted in throwing the mechanism into gear unless very light engine torque was created and applied.

The curve "t" shows the maximum engine torque which may be applied at different vehicle speeds. It will be observed that this curve is substantially flat between 5 and 35 M. P. H. Now, such a curve could not be had where the engine was coupled to the vehicle thru a friction clutch which permitted but little slippage. But where a fluid coupling is employed it will be found that, by the time the vehicle has reached a speed of 5 M. P. H., and the driven element 44 of the fluid coupling, acting thru the underdrive gear-set, is revolving about 490 R. P. M., the driving element 34 and therefore the engine, have speeded up thru slippage to about 1000 R. P. M. at which point the engine is delivering its maximum torque.

Inasmuch as a planetary gear-set such as is herein shown becomes structurally impractical if made with a ratio greater than about 1.75 to 1, the combination of such a gear-set with a fluid coupling is important, for, where an engine is connected to the gear-set without slippage, the engine can not, at the lower vehicle speeds, run ahead to its maximum torque point, and therefore, where the engine is thus solidly connected to the gear-set, there must be provided a gear-set giving considerably greater reduction to enable the engine to accelerate the vehicle from the lower speeds with sufficient rapidity. When in turn a gear-set having such greater reduction is provided, there results considerable engine rushing when the vehicle is being accelerated up to about 35 M. P. H. thru the gears.

In the combination herein disclosed the gear-set has a ratio of about 1.625 to 1. This ratio becomes ample for acceleration at low vehicle speed because the engine may race ahead to its highest torque point, and it does not provide too great a reduction at the higher speeds to cause engine rushing because, at the higher speeds, there is substantially no slippage in the fluid coupling and the engine therefore runs no faster than the driven fluid coupling member 44.

Due to the great angle of the helical teeth 141 of the sun gear 124 and the hooked-under nature of its jaw teeth 138, and the further fact that the point of application of the tangential load on the sun gear is closed to the axis than the torque load applied to the direct drive clutch teeth 160, it may be found that the engine torque required to force the sun gear to its extreme operative position shown in the drawings is about half the torque necessarily applied to force the direct drive clutch out of engagement. The curve "u" is plotted with half the value for a given speed as the curve "q".

From the diagram it will be seen that, having created any torque curve similar to "t" which, at the existing speed, is somewhere above the curve "q" and thereby enforced disengagement of the direct drive clutch and engagement of the gear drive, it will be necessary to reduce the torque "t" until it is somewhere below the curve "u" before the sun gear moves toward the space 156 far enough to permit the faces of the teeth 160, (see Fig. 11) to rub against the faces of the teeth 166 and 174. After this the direct drive may best be reestablished by releasing the accelerator and allowing the braking action due to the friction between the faces of the teeth 160 and the teeth 166 and 174 to aid engine deceleration until synchronism between the said teeth is established.

During gear drive the engine is always rotating the driving clutch ring 168 faster than the speed of rotation of the driven clutch ring 158. When the applied engine torque is reduced to a point below the curve "u" and the faces of the direct drive clutch teeth come together as above indicated, the outer clutch ring 168 is dragged backward in the direction of the arrow 212 by the frictional contact until its lugs 170 touch the spokes 76 whereby the teeth 166 and the teeth 174 are misaligned thereby preventing entry of the teeth 160 as long as the speed of the driving clutch rings is faster than that of the driven.

When, however, the engine, aided by the friction between the ends of the direct drive clutch teeth, loses sufficient momentum to establish synchronous speeds between the driving and driven clutch rings, any further decrease of engine speed which is sufficient to cause it to lose $\frac{1}{32}$ of a revolution with respect to the driven clutch ring, causes the outer driving clutch ring 168 to be dragged forward in the direction of the arrow 214 until its lugs 170 engage the spokes 76, whereupon the driving clutch teeth 166 and 174 are aligned as in Fig. 12 and the driven teeth 160 will be seated between the driving teeth 166 and 174 by the force of the springs 184. It is obvious that the direct drive clutch will thus engage without clash. The driven shaft 78, and consequently the worm 80, will be revolved either at engine speed or at $$\frac{1}{1.625}$$

or 61½ percent of engine speed, depending on whether the direct or gear drive is in effect, assuming, in either case, that slippage between the driving and driven elements of the fluid coupling has substantially ceased. In starting from a dead stop, however, it may be expected that the worm 80 will not, at speeds much below 5 M. P. H. be revolving more than 25 percent of engine speed.

Within the axle housing 64 the worm 80 is in constant mesh with the hollow worm wheel 216. Worm wheel 216 has end supporting flanges 218 and 220 secured to the worm by screws 222 and 224 respectively. Hubs 226 and 228, carried respectively in the flanges 218 and 220, are rotatably supported in ball bearings 230 carried in the bearing plate 68 and end head 70.

The advantage of employing a worm and wheel as axle gearing, instead of the more commonly employed bevel gearing, in combination with the fluid coupling arranged as shown will be apparent when it is considered that, if bevel axle gearing were used in such a combination the center line 2—2 of Fig. 1 would coincide with the center line 3—3 thereof. The bottom of the flywheel would then be so near the road surface as to make the whole structure much less desirable.

Immediately inside the hollow worm wheel is the overdrive planet pinion carrier which is also a hollow structure comprising the member 232 having end heads 234 and 236 secured thereto by screws 238 and 240 respectively. Hubs 242 and 244 are carried centrally in the end heads 234 and 236 respectively. The hub 242 has rotative bearing on a short bronze bushing 246 carried on the outside of the hub 226, while the hub 244 has rotative bearing in a bronze bushing 248 carried within the hub 228. The bronze bushings 246 and 248 are operative only when the vehicle is being driven backwardly.

The inwardly extending portion of the hub 242 is cut away at four places 250 (see Fig. 6) for the overdrive planet pinions 252. Supported in the hub 242 at opposite sides of the slots 250 are the pinion studs 254 which carry the roller bearings 256 upon which the pinions rotate.

A sun gear 258 having teeth 259 in constant mesh with the teeth of the pinions 252 has a long hub 260 supported in a bronze bushing 262 held within the hub 226. The sun gear carries no radial load and the bronze bushing is therefore adequate to hold it centrally supported.

The differential pinion carrier 264 contains the bevel pinions 266 rotatable upon the spider 268. The bevel gears 270 are integral with the axle shafts 272 and 274. A flange 276 extending from the carrier 264 has the ring gear 278 secured thereto by the screws 280, the teeth 281 of the ring gear being in constant mesh with those of the planet pinions 252. The differential carrier 264 is rotatable in ball bearings 282 one of which is supported directly in the end of the member 232 and the other in a recessed end of the hub 242.

In a planetary gear-set of the type shown having as main elements in addition to the planet pinions, a ring gear usually designated as "R", a planet pinion carrier designated as "C", and a sun gear designated as "S", it is well known that (1) if "S" is held against rotation, "R" is made the driver, and "C" the driven, as is done in the case of the underdrive gear-set hereinbefore described, a reduction in speed will be provided; (2) that if "S" is held against rotation, "C" is made the driver, and "R" the driven, an increase in speed will be provided; (3) that if any two members such for instance as "S" and "C" are both made drivers while "R" is made the driven a direct drive will be provided; (4) that if "C" is held against rotation while "S" is made the driver and "R" the driven, "R" will rotate in the reverse direction; and (5) that if "S" only is made the driver while "R" is connected to the driven elements and "C" is left wholly free, "C" will revolve idly, slowly forward, and no driving connection will be had between the driving and driven members.

The underdrive gear-set first described herein operates by making the first of the above connections, while the overdrive gear-set last described has means for making connections 2—5, manual control means being provided to elect between operating the vehicle forwardly, operating it rearwardly, or letting it stand still while the engine rotates, and automatic means being provided to change from direct forward to overdrive forward and vice versa at predetermined vehicle speeds.

The manual control means is contained in the end head 70 and comprises the sliding collar 284 having internal splines fitting slidably over the external splines 286 of the hub 244, internal clutch teeth 288 slidable over external teeth 290 formed on the hub 228, and external clutch teeth 292 slidable into the internal teeth 294 of the plate 296 which is held against rotation to the end head 70 by the rivets 298.

A fork 300 carries rollers 302 on studs 303 which extend into a groove 305 in the collar 284. A splined shaft 304 extends from the lever 306 thru a splined opening in the fork. A nut 308 holds the shaft in place but leaves it free to rotate. A detent ball 310 and spring 312 (see Fig. 10) retain the lever 306 in its several positions. Any convenient connecting means (none shown) may be provided whereby the operator may move the lever 306 to its several positions. A lid 314 held on by screws 316 facilitates assembly of the fork in the end head.

The automatic control means is contained in the head 66. Its function is to normally compel the sun gear 258 to rotate in unison with the worm wheel 216 to provide direct drive but to hold the sun gear against rotation whenever the applied power is momentarily released while the vehicle is operating above a predetermined speed to provide overdrive. To perform this function, jaw clutch mechanism is employed wherein one jaw clutch engages before the other disengages in order that there may be no free wheeling at any time, not even in the transition period between direct and overdrive.

A spider 318 has internal splines extending snugly into the external splines 320 of the axle shaft 272. Pairs of arms 322 extend outwardly for hingedly supporting the centrifugal weights 324 on the hinge pins 326. Stops 328 extend from the arms 322 and stop pins 330 in weights 324 limit outward movement of the weights. A collar 332 has axially extending driving lugs 334 extending between pairs of arms 322 whereby said collar is rotated in unison with the spider, but is axially movable with respect thereto. Lever arms 336 depending from the weights 324 extend into notches 338 in the ends of the lugs. The driving lugs 334 are long enough that they do not come completely out of the spaces between the arms 322 when the weights 324 are in their extreme outer position.

The axially operable clutch member 340 has internal splines slidably fitted over the external splines 342 on the long hub 260 of the sun gear 258. The collar 332 surrounds the smaller end of the member 340 and shoulders against said member at 344. Axial movement of the collar 332 by the weights 324 therefore moves the clutch member 340 axially, altho the said collar and clutch member are rotating at different speeds.

Driving the centrifugal mechanism in unison with an axle shaft insures that the transition between direct and overdrive and vice versa will always be determined by the vehicle speed independently of what engine speed is being used to maintain it. A spring 346 is interposed between the end of the bushing 262 and the hub of the clutch member 340 whereby the said clutch member 340, collar 332 and weights 324 are normally held in the positions shown. The end of the clutch member 340 has external clutch teeth 348 and internal clutch teeth 350.

Axially slidable on the external splines 352 of the hub 226 is the internally splined clutch hub 354 which has external clutch teeth 356 normally engaged, as shown, with the internal clutch teeth 350 of the clutch member 340. An integral flange 358 extends outwardly from the outside of the hub 354.

A clutch ring 360 has short external splines axially slidable in the somewhat longer internal splines 362 formed on the interior of the head 66, whereby said ring is nonrotatable but axially movable. A hub on one side of the ring 360 has internal clutch teeth 366 adapted to receive the external clutch teeth 348 of the clutch member 340. An integral flange 368 extends inwardly from the body of the ring 360. A bronze wear washer 370 is interposed between the flanges 358 and 368.

The hub of the clutch member 340 has six equally spaced holes 341 extending axially therethru, three of them containing springs 372 and the other three containing studs 374. A ring 376 has six equally spaced bosses 378 over three of which the ends of the springs extend, and into the other three of which the small ends of the studs 374 are riveted.

The heads of the studs 374 limit expansion of the springs to the length shown except when the clutch member 340 is moved axially by outward movement of the weights 324. A washer 382 has internal splines extending into the external splines 342 to insure that the base upon which the ends of the springs 372 rest will always revolve at the same speed as the holes in the clutch member which contain the springs.

At three circumferentially equally spaced points in the face of the clutch ring 360 are pockets for holding the one end of the springs 384, the other end being held in correspondingly spaced pockets in the bearing plate 68. The springs 372 and 384 are exactly alike but are here given different numerals to facilitate description. A shoulder 364 limits end movement of the ring 360 by the spring 384.

In the drawings the axle mechanism (see Fig. 3) is shown as it would appear when at rest. The weights 324 are in their innermost position. The internal clutch teeth 350 of the clutch member 340 are in full engagement with the external clutch teeth 356 of the clutch hub 354. The clutch member 340 being splinedly mounted on the hub of the sun gear, and the clutch hub 354 being splinedly mounted on the hub of the worm wheel 216, it follows that the only effect of the entire automatic clutch operating mechanism within the head 66, at this time, is to drivably connect the sun gear to the worm wheel. The sun gear is thereby connected for direct drive forward, for neutral, and for reverse positions. It is only after a speed of 50 M. P. H. has been passed and the weights have moved to their outermost position that the sun gear is otherwise connected, and it is then connected to the nonrotatable ring 360.

In Fig. 9 is shown schematically how the adjacent meshing faces of the clutch teeth of the direct-to-overdrive connecting mechanism are beveled to insure transition from direct to overdrive and vice versa without an interval between wherein there is no connection between the engine and vehicle wheels.

The two middle rows of teeth 348 and 350 are actually carried on the outside and inside respectively of the clutch member 340, as in Fig. 3, but are shown in Fig. 9 for illustrative purposes as being side by side, the teeth 356 being on the clutch hub 354 and the teeth 366 in the nonrotatable ring 360. Normally the teeth 356 and 350 are fully engaged, as in Fig. 3, for direct drive, the teeth 348 and 366 being fully meshed only after the transition period to overdrive.

The faces 349 are beveled so that the edges 351 of the teeth are only ¾ as wide as originally. Thus the teeth 356 may enter into the spaces between the teeth 350 until the edge 353 extends to a depth midway of the edges 355 and 357, that is, becomes half meshed, and the teeth 356 may still rotate in the direction of the arrow 380 faster than the teeth 350 by ratcheting over them. Similarly the non-rotating teeth 366 may enter into the spaces between the teeth 348 until the edge 359 is midway of the edges 361 and 363, that is, half meshed, and the teeth 348 may still rotate in the direction of the arrow 380 by ratcheting over the teeth 366 as long as the teeth 348 do not rotate faster than the teeth 356. In practice, as in Fig. 3, the abutting flanges 358 and 368 limit the distance that both sets of teeth may be entered, at the same time, to about one third full depth, instead of one half full depth. The manner in which this arrangement operates will be hereinafter more fully described.

Proportion

While the transmission shown may be designed for an engine of any horsepower, some indication of its proportion for a given horsepower may preferably be given.

With an engine of 85 to 90 H. P. at 3800 to 4200 R. P. M. and a total vehicle weight of 2600 to 2900 pounds, the proportion of most of the parts may be gotten by taking the largest diameter of the worm wheel 216 as 9 inches and making all other parts of the mechanism to the same scale. Some of the dimensions which are not readily gotten by scaling the drawings are as follows:

The helix angle of the underdrive gear-set should be 45 degrees. The ring gear should have a pitch diameter of 5.6568 inches and have 64 teeth; the sun gear a pitch diameter 3.5355 inches and have 40 teeth; and the planet pinions a pitch diameter 1.0606 inches and have 12 teeth. The rule for ratio when the sun gear is held against rotation and the ring gear is the driver is, one revolution of the driven carrier "C" is produced by $$\frac{R+S}{R}$$

revolutions of the driver "R". The underdrive ring gear "R" must therefore revolve $$\frac{64+40}{64}=1.625$$

revolutions to 1 of the carrier "C".

In planetary gearing of the type herein employed the ratio available is confined within narrow limits, being always less than 2 to 1 and more than 1 to 1, the practical limit being reached at about 1.75 to 1 for most and 1.25 to 1 for least reduction. A ratio of 2 to 1 would be obtainable only if it were possible to make the diameter of the sun gear and ring gear equal, which would make the planet pinions zero diameter, while the ratio of 1 to 1 would be obtainable only were it possible to make the planets half the ring gear diameter which would require a sun gear of zero diameter. The hook-under angle 139 of the sun gear clutch teeth 138 is preferably about 30 degrees. The proportion of the centrifugal weights 198 and of the clutch engaging springs 184 of the underdrive gear-set have been hereinbefore given.

The worm 80 has a pitch diameter of 1⅔ inches and a quintuple thread the lead angle of which is 45 degrees. The worm wheel 216 has a pitch diameter of 8⅓ inches and has 25 teeth. The worm and wheel therefore has a ratio of 5 to 1.

The helix angle of the overdrive gearing is 23 degrees. The ring gear has a pitch diameter of 5.431 inches and has 40 teeth, the sun gear a pitch diameter of 2.172 inches and has 16 teeth, and the planet pinions a pitch diameter of 1.629 inches and have 12 teeth.

When reversing is to be done with gearing of this type the sun gear is made the driver and the carrier is held against rotation, the ring gear being the driven member. The rule in this case is 1 revolution of the sun gear produces $$\frac{S}{R}$$

revolutions of "R" backwardly. The reversing ratio is then $$\frac{16}{40}=\frac{2}{5}$$

That is, one revolution of the sun gear produces two-fifths of a revolution of the ring gear backwardly.

When overdrive is to be effected, the sun gear is held against rotation and the planet pinion carrier is made the driver. The rule in this case is one revolution of the carrier produces $$\frac{R+S}{R}$$

revolutions of the ring gear. The overdrive ratio is then $$\frac{40+16}{40}=\frac{7}{5}$$

that is, one revolution of the driver carrier produces 1⅖ revolution of the driven ring gear.

The coil spring 346 is made of ⅛ inch round wire coiled to 2 3/32 inch pitch diameter, has about ten turns and a free height of 8.3 inches. The small springs 372 and 384 are exactly alike and are made of .041 inch round wire coiled to 7/16 inch pitch diameter and have about twenty turns and a free height of 2.2 inches.

From the foregoing proportions it will be seen that the engine-to-wheel ratios are, for starting and heavy load 8⅛ to 1; for direct drive with moderate load and speeds 0 to 50 M. P. H. 5 to 1; for overdrive, moderate load and speeds over 50 M. P. H. 3.57 to 1; and for reversing, ordinary load, 12½ to 1 except when the reversing pull is very heavy and thereby brings the underdrive gear-set into action whereupon the reversing ratio will be 20 5/16 to 1.

In common practice the 8⅛ to 1 for lowest available forward engine-to-wheel ratio would be considered insufficient, a ratio of 10 or 11 being more often used. But the 8⅛ to 1 reduction, when combined with a fluid coupling will give better results than a 10 to 1 ratio employed with the conventional clutch, because of the fact that with the fluid coupling the engine may run ahead and reach its most efficient torque point while the vehicle is still moving at the lower speeds.

Also, in common practice, the 5 to 1 engine-to-wheel ratio for direct drive would be considered too slow, a ratio of 4 to 1 being more often used. But this is not because the 5 to 1 ratio would not be better at speeds below 50 M. P. H., but because it would result in too much engine rushing at speeds around 70 M. P. H. Where, however, a ratio of 3.57 to 1 is provided in the form of an overdrive for speeds above 50 M. P. H., the 5 to 1 direct drive ratio for speeds under 50 M. P. H. is much more desirable.

Operation

The operation of the mechanism may be carried out as follows:

With the manually shiftable lever 306 in the neutral position shown the engine may be started and rotated for warming it up when required. The sun gear 258 is now connected to the worm wheel 216 thru the automatic mechanism within the head 66. The ring gear 278 being held stationary by the resistance which the vehicle offers to being moved, causes the planet pinion carrier 232, which is not now connected to anything, to revolve slowly forward at $$\frac{2}{35}$$

engine speed.

The manually shiftable lever 306 may next be moved to engage the clutch teeth 292 with the clutch teeth 294 whereby the planet pinion carrier 232 is held against rotation. The sun gear 258 being still connected to the worm wheel 216, rotation of said sun gear by said worm wheel forwardly by the engine will now rotate the ring gear 278 backwardly whereby the vehicle will be driven backwardly at 12½ to 1 engine-to-wheel ratio, except under severe load in which case the underdrive gear-set will cut in and the reversing ratio will be 20 1/16 to 1.

The manually shiftable lever 306 may next be shifted to cause engagement of the clutch teeth 288 with the clutch teeth 290. This connects the planet pinion carrier 232 to the worm wheel 216. The sun gear 258 is already connected to the worm wheel 216 thru the automatic mechanism in the head 66. In this condition the planet pinions 252 can not rotate on their studs 254 and therefore the ring gear 278 is also driven forwardly at the same speed as the worm wheel 216, whereby there is provided, for forward driving, an engine-to-wheel ratio of 5 to 1, unless an engine torque somewhere above the curve "q", Fig. 22, is applied, in which case an engine-to-wheel ratio of 8⅛ to 1 is provided by cutting in the under-drive gear-set.

With the manual connection thus made for forward driving, this connection may be maintained unless and until it is desired to race the engine or reverse the vehicle. While this connection is in effect the vehicle may be started from rest and operated with the 5 to 1 ratio, if rapid acceleration is not desired, by keeping the applied torque between the curves "q" and "u" Fig. 22. The 8⅛ to 1 ratio may be brought in at any time below 34 M. P. H. by momentarily applying torque above the curve "q" after which this 8⅛ to 1 will remain in effect until the torque is reduced below the curve "u" whereupon the 5 to 1 ratio may be reestablished. Once established, the 8⅛ to 1 ratio may be continued as long as desired, but may be exchanged for the 5 to 1 ratio at any time by momentary release of the accelerator pedal.

The foregoing connections cover all ordinary driving, but at speeds over 50 M. P. H. the overdrive gear-set may be brought into play to reduce the engine speed. This is also done by momentary release of the accelerator pedal after a speed of 50 M. P. H. is passed.

Below 50 M. P. H. the force of the large spring 346 alone is sufficient to hold the weights 324 in the position shown. Above 50 M. P. H. the spring 346 plus the friction, under load, of the engaged clutch teeth 350 and 356 will hold the weights to the position shown. But any time, after a speed of 50 M. P. H. has been passed, that the accelerator pedal is released, and the friction, under load, of the teeth 350 and 356 is reduced to near zero, the force of the spring 346 will be insufficient to hold the weights 324 and they will quickly move outward until the stop pins 330 are arrested by the stops 328.

As the weights 324 move outwardly the clutch member 340 moves axially whereupon the faces of the teeth 348 engage the faces of the teeth 366, but inasmuch as these teeth can not engage because the clutch member 340 is revolving about 600 R. P. M. and the ring 360 is non-rotatable, the ring 360 is pushed axially ⅝ inch up to the bearing plate 68 against the resistance of the light springs 384.

Now this ⅝ inch axial movement of the ring 360 takes with it the flange 368, and, due to the expansion of the light springs 372, the flange 358 follows, thereby, for the time being, keeping the clutch teeth 350 and 356 fully engaged. But when the end of the hub 354 encounters the edge 355 of the ball bearing 230, as it does after 1/16 inch movement, the flange 358 can move no further and the clutch member 340 and ring 360 continue moving on until the flange 368 is drawn away from the flange 358 leaving a gap between them of 1/16 inch, and the teeth 350 are pushed ⅔ of the way out of mesh with the teeth 356 leaving them meshed ⅛ inch or ⅓ of their width.

Now it will be remembered that the fuel was momentarily interrupted to allow the weights 324 to move out and rearrange the clutch members 35 as above stated, and if this interruption is allowed to continue for about three seconds, that is, until the engine and worm wheel have been reduced to 5/7 of their former speed, while the ring gear remains at substantially the same speed due to vehicle momentum, the sun gear will thereby have been caused to lose enough speed to bring it to zero revolutions.

The reason why the sun gear may lose this much speed with respect to the worm wheel when they are directly connected by the ⅓ mesh of the teeth 350 and 356 is because of the way their adjacent faces are beveled at 349 as explained relative to Fig. 9, that is, the teeth 350 which revolve in unison with the sun gear 258 and the teeth 356 which revolve in unison with the worm wheel 216 are beveled in such a manner that the sun gear may lose speed with respect to the worm wheel by the ratchet effect of the beveled faces 349 when the teeth are ⅓ meshed but may not gain speed in respect therewith, loss in speed being a movement in reverse of the arrow 380.

Now to maintain direct drive connection it is only necessary to keep the sun gear from rotating at a speed in excess of that of the worm wheel, and, inasmuch as the ratchet effect of the said beveled faces prevents such excess speed, it follows that the direct drive connection is not unmade while the sun gear is being brought to zero revolutions preparatory to holding it against rotation for overdrive.

Thus if the operator waits only one second after he has interrupted the fuel and the weights have moved out and rearranged the clutch parts as above described, and he then reapplies the fuel before waiting the other two seconds required to bring the sun gear back to zero revolutions to make full depth overdrive connection, he merely operates in direct drive, altho the weights are out, because the ratchet action of the ⅓ engagement of the teeth 350 and 356 prevents the speed of the sun gear exceeding that of the worm wheel and consequently maintains direct drive.

If, however, after the first second has elapsed, and the weights are out, and the clutch parts have been rearranged as above indicated, the operator waits the additional two seconds until the sun gear loses its momentum and reaches zero revolutions the springs 384 will expand and move the non-rotatable clutch ring 360 away from the plate 68 and fully mesh its teeth 366 with the now non-rotating teeth 348 which are connected to revolve in unison with the sun gear.

As the ring teeth 366 slide over the teeth 348 the flange 368 acts against the wear ring 370 and flange 358 and completely unmeshes the ⅓ meshed teeth 350 and 356 so that their beveled faces 349 need not ratchet over each other during overdrive operation. As long as the sun gear is held against rotation overdrive will be in effect.

Due to the fact that the weights 324 have more force at the same speed when in the "out" position than when in the "in" position, it is necessary to bring the vehicle speed down to about 45 M. P. H. before the spring 346 has force enough to move the weights back inward against their outward centrifugal force.

Any time then, at a speed below 45 M. P. H., that the operator momentarily interrupts the fuel of the engine, the reverse of the process hereinbefore described takes place. The spring 346 expands, moving the clutch member 340 axially, the teeth 350 of which shove the teeth 356 of the clutch hub 354 ahead against the resistance of the light springs 372 because the teeth 350 are now non-rotating and the teeth 356 are rotating. The ring 360 follows until stopped by the shoulder 364. The member 340 continues on thereby pulling the flanges 358 and 368 apart, as before. The ring teeth 366 and clutch member teeth 348 are left ⅓ meshed but their faces being beveled as at 349, Fig. 9, the teeth 348 may ratchet over the ⅓ meshed teeth 366 when power is reapplied.

The reapplied power causes the stationary teeth 348 to take up speed until they equal the speed of the worm gear 216, as the reapplied fuel causes the worm, which during overdrive is revolving at 5/7 normal speed, to resume normal speed. When the sun gear gains sufficient speed to equal the speed of the worm wheel, the springs 372 acting against the collar 376 push the teeth 356 into the spaces between the teeth 350, and in doing so cause the flange 358 to act on the flange 368 and thereby unmesh the ⅓ meshed teeth 348 of the clutch member, from the teeth 366 of the ring.

By keeping the teeth 348 and 366 meshed ⅓ of their width until the direct drive teeth become meshed, no free wheeling is possible at any time. If the operator, below speeds of 45 M. P. H. interrupts the fuel and allows the weights 324 to go in, and he then fails to reapply the fuel and thereby fails to complete the meshing of the direct drive teeth 350 and 356, the engine will be driven by vehicle momentum as soon as the teeth 348 try to turn backwardly of the direction of the arrow 380 and encounter the teeth 366 with which they are meshed ⅓ of their depth.

From the foregoing it will be seen that the mechanism herein shown, by employing a relatively low axle reduction having an engine-to-wheel ratio of 5 to 1 in combination with a fluid coupling, a speed range from 0 to 60 M. P. H. may satisfactorily be had without other than axle gearing except when rapid acceleration is desired; that rapid acceleration may be had thru gearing giving 8⅓ to 1 engine-to-wheel reduction by momentarily applying a considerable proportion of the full engine torque, said proportion varying with the vehicle speed, less torque bringing in the gear at the lower vehicle speeds where gearing is more necessary for acceleration; that when combined with a fluid coupling an 8⅓ to 1 engine-to-wheel reduction is more effective at the lower speeds than a 10 or 11 to 1 reduction when connected directly to the engine; that the 5 to 1 axle gearing is not too slow but preferable when an overdrive giving a 3.57 to 1 engine-to-wheel reduction is provided for speeds above 50 M. P. H.; that the changes from underdrive to direct, and from direct to overdrive are made without free wheeling either before, after, or during the transition period; that there are no spring, roller, or friction clutches contained in the mechanism; and that the number of different speeds provided are had with a minimum of gearing.

While the embodiment disclosed contemplates its use as a rear axle, the same may be used as a front axle by changing the worm from right to left, or the underdrive gear-set, the fluid coupling, and the engine may be more widely spaced from the axle than in the embodiment shown, that is, more as in common practice. Thruout the specification the words "axle gearing" refer to the worm 80 and wheel 216 or their equivalent, and are not intended to include the planetary underdrive gear-set, the planetary overdrive gear-set or the bevel differential gears shown. The claims herein are all confined to the mechanism within the axle housing, and in the claims the driving member is the member which carries the worm wheel 216.

Having described my invention, I claim—

1. Automotive power transmission mechanism comprising, axle shafts, a driving member, differential gearing interposed between said driving member and said axle shafts, speed increasing gearing interposed between said driving member and said differential gearing, and means including centrifugal weights on one of said axle shafts operable at a predetermined speed for causing said speed increasing gearing to revolve the axle shafts faster than the driving member.

2. Automotive power transmission mechanism comprising, axle shafts, a driving member, differential gearing interposed between said driving member and said axle shafts, a differential pinion carrier, an internal ring gear secured to said carrier to rotate therewith, planet pinions in constant mesh with said ring gear, a sun gear in constant mesh with said planet pinions, a planet pinion carrier, clutch means normally securing said sun gear directly to said driving member to rotate in unison with said driving member, selectively operable clutch means to either secure the planet pinion carrier directly to the driving member while said sun gear is also secured thereto, whereby the axle shafts are revolved in unison with the driving member; to hold the planet pinion carrier against rotation while the sun gear is still secured to the driving member to rotate therewith, whereby the axle shafts are revolved oppositely of the driving member; to disconnect the planet pinion carrier from the driving member while the sun gear is still secured to the driving member to rotate therewith, whereby the driving member may revolve without revolving the axle shafts; or to cause the sun gear to be held against rotation while the planet pinion carrier is secured for rotation with the driving member, whereby the axle shafts are revolved faster than the driving member.

3. Automotive power transmission mechanism comprising, axle shafts, a driving member, differential gearing interposed between said driving member and said axle shafts, a differential pinion carrier, an internal ring gear secured to said carrier to rotate therewith, planet pinions in constant mesh with said ring gear, a sun gear in constant mesh with said planet pinions, a planet pinion carrier, clutch means normally securing said sun gear directly to said driving member for rotation in unison with said driving member, clutch means operative above a predetermined speed for freeing said sun gear from said driving member and holding the said sun gear against rotation, and manually operable clutch means for selectively holding said planet pinion carrier against rotation; for securing said planet pinion carrier to rotate in unison with said driving member; or for freeing the planet pinion carrier from said driving member to rotate independently thereof.

4. Automotive power transmission mechanism comprising, an axle housing, a hollow axle drive gear having rotative bearing at each end in said housing, a hollow planet pinion carrier within said drive gear rotatably supported at each end, the inner end face of said carrier having planet pinions rotatably supported thereon, a sun gear in constant mesh with said planet pinions having a hub extending thru the ends of the drive gear and planet pinion carrier, a hollow differential pinion carrier within and rotatably supported in the ends of said planet pinion carrier, said differential pinion carrier having a ring gear secured thereto in constant mesh with the said planet pinions, axle shafts extending oppositely from within said differential pinion carrier thru the ends of said planet pinion carrier and said drive gear, differential gears on said shafts and differential pinions carried by said differential pinion carrier in constant mesh with said differential gears, means carried on the one end of said planet pinion carrier selectively connectable either to the drive gear or to a non-rotatable means carried on said housing, and means at the other end on the hub of said sun gear selectively connectable either to the drive gear or to a second non-rotatable means carried by said housing.

5. In automotive vehicle mechanism, an engine, an overdrive gear-set comprising, a driven member connected for driving the vehicle, a ring gear on the driven member, a sun gear, planet pinions in constant mesh with both the ring gear and the sun gear, a planet pinion carrier, a driving member rotated by the engine, means securing the said carrier to the driving member for rotation therewith, a non-rotatable clutch means, a clutch means on the driving member, a sun gear clutch means adapted for connection to the non-rotatable clutch means for overdrive, and to the driving member clutch means for direct drive, speed responsive means, normally maintaining the said direct drive connection, operative at a predetermined speed to make the overdrive connection, and means whereby the direct drive connection and the overdrive connection may both be made at the same time during the transition period between the two connections, whereby the power of the engine may always drive the vehicle and vehicle momentum may always rotate the engine, during direct drive connection, during overdrive connection, and during the transition period between direct and overdrive connections.

6. The structure defined in claim 5, wherein the speed responsive means is on the driven member.

7. The structure defined in claim 5 wherein the clutch means are all toothed clutch members and the teeth for making the direct and overdrive connections are both in mesh at the same time during the transition period.

8. The structure defined in claim 5 with means on the clutch parts whereby each may force the other out of its partial engagement after the transition period when full engagement of either takes place.

9. In automotive vehicle mechanism, an engine, an overdrive gear-set comprising a driven member connected for moving the vehicle, a ring gear on the driven member, a sun gear, planet pinions in constant mesh with both the ring gear and the sun gear, a planet pinion carrier, a driving member rotated by the engine, means securing the said carrier to the said driving member for rotation therewith, a toothed clutch part secured against rotation, a toothed clutch part secured to the driving member for rotation therewith, a toothed clutch part secured to the sun gear for rotation therewith, speed responsive means normally maintaining engagement of the toothed clutch part on the sun gear with the toothed clutch part on the driving member for direct drive connection, but operative at a predetermined speed to engage the non-rotatable toothed clutch part for overdrive connection, the adjacent faces of the engaging teeth being beveled to such an extent that when both direct and overdrive connections are not more than half way entered, the sun gear member may not rotate backwardly but may rotate forwardly at any speed not in excess of the driving member clutch part, whereby, during the transition period from direct to overdrive or from overdrive to direct drive, the engine may always drive the vehicle when the sun gear clutch part is made to rotate as fast as the driving member clutch part, and the vehicle will always rotate the engine when the sun gear clutch part slows up to zero revolutions.

10. The structure defined in claim 9 wherein the driving member clutch part and the non-rotating clutch parts having abutting surfaces whereby, when one assumes as much as half way engagement, the other is forced by said abutting surfaces to less than half way engagement.

11. In an automotive axle, a main driving member, a planet pinion carrier, planet pinions revolved by said carrier, a ring gear in mesh with said planet pinions, axle shafts, means drivably connecting said ring gear to said axle shafts, a sun gear in mesh with said planet pinions, clutch means to directly connect said carrier to the main driving member, means to connect said sun gear to the main driving member, means to hold said carrier against rotation, and means to hold said sun gear against rotation.

12. In an automotive axle, a main driving member, a planet pinion carrier, planet pinions revolved by said carrier, a ring gear in mesh with said planet pinions, axle shafts, means drivably connecting said ring gear to said axle shafts, a sun gear in mesh with said planet pinions, means operative in one or the other direction for respectively connecting the carrier to the main driving member or holding it against rotation, and means operative in one or the other direction for respectively connecting the sun gear to the main driving member or holding it against rotation.

13. In an automotive axle, a driving element, a planet pinion carrier, planet pinions revolved by said carrier, a ring gear in mesh with said planet pinions, axle shafts, means drivably connecting said ring gear to said axle shafts, a sun gear, normally connected for rotation to said driving element, in mesh with said planet pinions, means operative to selectively connect said carrier to said driving element, to disconnect it for idle rotation, or to hold it against rotation, and means optionally operative after a predetermined speed is exceeded to disconnect said sun gear from said driving element and hold it against rotation.

14. In an automotive axle, a main drive gear, a planet pinion carrier, planet pinions revolved by said planet pinion carrier, a differential pinion carrier, differential pinions revolved by said differential pinion carrier, axle shafts, differential gears on said axle shaft in mesh with said differential pinions, a ring gear on said differential carrier in mesh with said planet pinions, a sun gear in mesh with said planet pinions, clutch means to directly connect the planet pinion carrier to the main drive gear, means to hold the planet pinion carrier against rotation, means to connect the sun gear to the main driving gear, and means to hold the sun gear against rotation.

15. An automotive axle comprising a housing, axle shafts rotatable in said housing, a driving member rotatable in said housing, a planet pinion carrier rotatable in said housing, planet pinions revolved by said carrier, a ring gear in mesh with said planet pinions, means drivably connecting said ring gear for rotating said axle shafts, a sun gear in mesh with said planet pinions, clutch means on the driving member, a non-rotatable clutch means on the housing, means on the carrier operable in one direction to engage the driving member clutch means and in the other direction to engage the non-rotatable clutch means, a second clutch means on the driving member, a second non-rotatable clutch means on the housing, means on the sun gear operable in one direction to engage the second driving member clutch means and in the other direction to engage the second non-rotatable clutch means.

16. An automotive vehicle axle comprising, a housing, a hollow driving member having rotative bearing at each end in said housing, a hollow planet pinion carrier having rotative bearing at each end in said driving member, a hollow differential pinion carrier having rotative bearing at each end in said planet pinion carrier, planet pinions revolved by said planet pinion carrier adjacent said differential pinion carrier, a ring gear secured to said differential pinion carrier in mesh with said planet pinions, differential pinions in said dfferential pinion carrier, differential gears within said differential pinion carrier in mesh with said differential pinions, axle shafts extending from said differential gears through said differential pinion carrier, a sun gear in mesh with said planet pinions, a hub on said sun gear extending through said driving member at one end, a hub on said planet pinion carrier extending through said driving member at the other end, a rotatable clutch means carried by the driving member at each end, a non-rotatable clutch means carried by the housing at each end, clutch means on the carrier hub operable in one direction into engagement with a driving member clutch means and in the other direction into engagement with a non-rotatable clutch means, and clutch means on the sun gear hub operable in one direction into engagement with a driving member clutch means and in the other direction into engagement with a non-rotatable clutch means.

17. The structure defined in claim 16 wherein the clutch means on the carrier hub is operable also to an intermediate position whereby the carrier is freed from both the driving member clutch means and the non-rotatable clutch means.

18. The structure defined in claim 16 having a centrifugal device within the housing at one end operative above a predetermined vehicle speed to disengage the sun gear clutch means from the driving member clutch means and engage it with the non-rotatable clutch means.

19. The structure defined in claim 16 having resilient means within the housing at one end normally holding the sun gear clutch means engaged with the driving member clutch means and a centrifugal device rotatable by vehicle movement, adjacent said resilient means, operable to overcome said resilient means at a predetermined speed and thereby disengage said sun gear clutch means from said driving member clutch means and engage it with the non-rotatable clutch means.

20. In an automatic axle, a driving member, axle shafts, a differential carrier rotatable about said shafts, differential gears connecting said carrier and shafts, a gear on said carrier, planet pinions in mesh with said gear, a planet pinion carrier connected for rotation with said driving member, a second gear in mesh with said pinions, centrifugal weights rotatable about said shafts, and a clutching member connecting said second gear for rotation with said driving member but operable by said weights above a predetermined speed to hold said second gear against rotation.

21. In an automotive axle, axle shafts, a main driving member, a planet pinion carrier, means for directly connecting the carrier to the main driving member, means for holding said carrier against rotation, planet pinions revolved by said carrier, a ring gear in mesh with said planet pinions, means drivably connecting said ring gear to the axle shafts, a sun gear in mesh with said planet pinions, and means drivably connecting said sun gear to said driving member.

22. In an automotive axle, axle shafts, a driving member, a planet pinion carrier, planet pinions revolved by said carrier, a ring gear in mesh with said planet pinions, a sun gear in mesh with said planet pinions, means drivably connecting said ring gear to the axle shafts, means drivably connecting said sun gear to the driving member, and means movable in one direction to directly connect the carrier to the driving member and in the other direction to hold said carrier against rotation.

23. In an automotive axle, a housing, a driving member in said housing, axle shafts in said housing, a ring gear, means drivably connecting said shafts and ring gear, planet pinions in mesh with said ring gear, a carrier for revolving said planet pinions, means directly connecting said carrier and driving member, a sun gear in mesh with said planet pinions, a toothed clutch member on the driving member, a toothed clutch member non-rotatably supported by the housing, a toothed clutch member splinedly mounted on the sun gear and normally engaging the driving member clutch member but shiftable axially to engage the non-rotatable clutch member, centrifugal weights rotatable on the axle shafts operable outwardly at a predetermined speed to shift the sun gear clutch member out of engagement with the driving member clutch member and into engagement with the non-rotatable clutch member, and a spring for returning the weights inwardly and the sun gear clutch member back into mesh with the driving member clutch member.

24. The structure defined in claim 23 wherein the driving member clutch member and the non-rotatable clutch member are both splinedly mounted for limited axial movement whereby they are pushed away by the sun gear clutch member when they are not synchronized therewith.

25. The structure defined in claim 23 wherein the driving clutch member and the non-rotatable clutch member are both splinedly mounted for axial movement, both have spring means urging them axially toward each other, and both have stops whereby the one stops the axial movement of the other.

26. The structure defined in claim 23 wherein the driving clutch member and the non-rotatable clutch member are both splinedly mounted for axial movement, both have spring means urging them axially toward each other, both have stops whereby the one stops axial movement of the other, and where said stops are so positioned that when the teeth of the sun gear clutch member have moved axially so as to be in engagement with the teeth of both the driving member clutch member and the stationary clutch member they may not enter the one more than half way without pushing the other to less than half way engagement, and where the faces of the teeth are so beveled that the sun gear clutch member may, when thus half way entered, rotate forwardly but not backwardly with respect to the stationary clutch member and forwardly but not faster than the driving member clutch member.

FREDERICK W. COTTERMAN.